(12) United States Patent
Vossel et al.

(10) Patent No.: US 6,688,588 B2
(45) Date of Patent: Feb. 10, 2004

(54) RUBBER BEARING WITH GRADUATED DAMPING BEHAVIOR

(75) Inventors: Andreas Vossel, Osnabrück (DE); Klaus Kramer, Neuenkirchen (DE)

(73) Assignee: ZF Lemforder Metallwaren AG, Dielingen (DE)

( * ) Notice: Subject to any disclaimer, the term of this patent is extended or adjusted under 35 U.S.C. 154(b) by 0 days.

(21) Appl. No.: 10/018,335

(22) PCT Filed: Mar. 27, 2001

(86) PCT No.: PCT/DE01/01155

§ 371 (c)(1),
(2), (4) Date: Nov. 1, 2001

(87) PCT Pub. No.: WO01/73315

PCT Pub. Date: Oct. 4, 2001

(65) Prior Publication Data

US 2002/0158386 A1 Oct. 31, 2002

(30) Foreign Application Priority Data

Mar. 27, 2000 (DE) .......................................... 100 14 808

(51) Int. Cl.⁷ ................................................. F16F 13/00
(52) U.S. Cl. .................................. 267/140.12; 267/141.2
(58) Field of Search ...................... 267/140.11, 140.12, 267/140.13, 140.14, 140.15, 141.2, 293

(56) References Cited

U.S. PATENT DOCUMENTS

| | | | | |
|---|---|---|---|---|
| 4,153,227 A | * | 5/1979 | Gamaunt ..................... 248/575 |
| 4,741,521 A | * | 5/1988 | Schiffner et al. ...... 267/140.12 |
| 4,790,520 A | * | 12/1988 | Tanaka et al. .......... 267/140.12 |
| 4,822,010 A | * | 4/1989 | Thorn .................... 267/140.14 |
| 4,840,357 A | * | 6/1989 | Jouade .................... 267/140.12 |
| 4,944,482 A | * | 7/1990 | Bouhier et al. ......... 267/140.13 |
| 4,958,811 A | * | 9/1990 | Brenner et al. ........ 267/140.12 |
| 5,044,813 A | * | 9/1991 | Gregg ....................... 403/225 |
| 5,123,634 A | * | 6/1992 | Schwerdt ................ 267/140.12 |
| 5,172,894 A | * | 12/1992 | Hein et al. .............. 267/140.12 |
| 5,251,884 A | * | 10/1993 | Bouhier .................. 267/140.12 |
| 5,379,991 A | * | 1/1995 | Delam et al. ................ 267/136 |
| 5,386,976 A | * | 2/1995 | Rudolph ................. 267/140.12 |
| 5,509,643 A | * | 4/1996 | Carstens et al. ....... 267/140.12 |
| 6,364,298 B1 | * | 4/2002 | Vossel et al. ................ 267/293 |
| 6,435,486 B2 | * | 8/2002 | Maier .................... 267/140.12 |

FOREIGN PATENT DOCUMENTS

| | | |
|---|---|---|
| DE | 39 09 609 | 10/1990 |
| DE | 37 35 698 | 12/1990 |
| DE | 42 22 486 | 1/1994 |
| DE | 198 45 979 | 4/2000 |
| FR | 2 555 688 | 5/1985 |
| FR | 2 701 299 | 8/1994 |
| GB | 2 342 422 | 4/2000 |

OTHER PUBLICATIONS

Vibro–Isolating Bush, Patent Abstracts of Japan vol. 010/No. 010, 1985.
Fluid–Filled Cylindrical Mount, Patent Abstracts of Japan vol. 17/No. 423., Aug. 6, 1993.

* cited by examiner

*Primary Examiner*—Jack Lavinder
*Assistant Examiner*—Benjamin Pezzlo
(74) *Attorney, Agent, or Firm*—McGlew and Tuttle, P.C.

(57) ABSTRACT

A rubber bearing with graduated damping characteristic has essentially a preferably cylindrical or approximately cylindrical inner part, a tubular outer sleeve arranged coaxially around the inner part as well as a pressure body with chambers for a damping agent. The pressure body is arranged in a fixed manner between the inner part and the outer sleeve. A rubber bearing which has a simple design and effectively damps forces introduced in different ranges of the characteristic due to its graduated damping characteristic is provided. The pressure body of the bearing is divided in the radial direction into a plurality of damping areas whose damping characteristics can be adjusted independently from one another by an intermediate sleeve arranged coaxially to the inner part and the outer sleeve.

18 Claims, 3 Drawing Sheets

RUBBER BEARING WITH GRADUATED DAMPING BEHAVIOR

FIELD OF THE INVENTION

The present invention pertains to a rubber bearing with graduated damping characteristic, which comprises, in the known manner, essentially a preferably cylindrical or approximately cylindrical inner part, a tubular outer sleeve arranged coaxially around the inner part, as well as a pressure body with chambers for a damping agent, which is arranged in a fixed manner between the inner part and the outer sleeve.

BACKGROUND OF THE INVENTION

Corresponding to the versatility of their use, rubber bearings must have greatly different properties in terms of their damping characteristic, and they are also stressed by the forces absorbed by them to different extents. Their damping characteristic is therefore optimized for the particular application by a suitable design of their geometry and/or by the selection of the elastomer of which the pressure body consists. Nevertheless, it is desirable to achieve a certain flexibility in manufacture in providing bearings with different properties. The bearings are also frequently subject to dynamically greatly varying conditions in terms of the forces acting on them during their practical use. It is therefore known that the bearings can be designed such that they can be adapted to the intended use during manufacture in a simple manner or that they have a certain broad range of dynamic damping characteristics.

A design of a rubber bearing which is said to make it possible to adapt its elastic properties to different needs during the manufacture in a simple manner has already become known through DE 39 09 609 A1. This document describes a rubber bearing in which a second spring body, which is arranged at a radially spaced location from the first spring body in the gap between the inner part and the outer sleeve, is arranged in parallel to the first pressure or spring body. The second spring body is designed as a two-part body in the form of an elastomer element provided on both front sides of the bearing. Damping of the bearing, which is supported by a liquid damping agent, is not provided according to the solution according to this document. The bearing is also suitable only conditionally for use for damping vibrations with amplitudes or frequencies in different ranges of the characteristic.

A hydraulically damping rubber bearing, which brings about vibration damping in two different frequency ranges, has been known from DE 42 22 486 A1. A plurality of chambers filled with a damping liquid are formed for this purpose in the spring element or pressure body. According to this solution, two outer chambers connected to one another via a channel in a liquid-carrying manner surround a chamber located radially farther inward. The chambers are limited against one another by rubber elastic expandable walls in their axial succession. According to the document, good insulation of higher-frequency vibrations is achieved by the inner chamber. The outer area of the spring element consequently has mainly a vibration-damping effect, whereas the inner area has a vibration-insulating effect. The comparatively great manufacturing effort for such a bearing can be considered to be disadvantageous. This is true especially concerning the liquid-tight mounting of the two vulcanized parts.

SUMMARY AND OBJECTS OF THE INVENTION

The object of the present invention is to provide a rubber bearing which has a simple design and effectively damps forces introduced in different ranges of the characteristic due to its graduated damping characteristic, while avoiding the drawbacks of the state of the art.

According to the invention, the bearing includes an inner part of a cylindrical or approximately cylindrical shape, a tubular outer sleeve arranged coaxially around the inner part, as well as a pressure body with chambers for accommodating a liquid damping agent. The pressure body is arranged between the above-mentioned parts. The pressure body is divided in the radial direction into a plurality of damping areas which can be adjusted in terms of their damping characteristics independently from one another by at least one intermediate sleeve arranged coaxially to the inner part and the outer sleeve.

A design that is certainly needed most often in practice and is obvious in terms of a compromise between the best possible damping and the manufacturing effort needed therefor concerns an embodiment with two damping areas in relation to the radial direction. According to the invention chambers for a damping agent may be provided within both damping areas of the pressure body in an embodiment. To achieve the completely closed nature of the damping areas, i.e., damping characteristics that do not mutually affect each other, there is a liquid-carrying connection only between the chambers of one damping area. An exchange of damping agent is not possible between the different damping areas due to the inserted intermediate sleeve.

Corresponding to a possible embodiment, which can be advantageously used, e.g., for mounting the suspension arms of a vehicle, the inner damping area has a softer characteristic than the outer damping area. However, an opposite design is also conceivable for special purposes to reduce the stress on the bearing. Besides the selection of different elastomers to form the damping areas, the different damping characteristics of these damping areas can also be achieved by the use of different types of damping agents of different viscosities for filling the chambers of the damping areas.

In a special embodiment of the rubber bearing, which is also intended for special applications, at least one damping area or both damping areas has different damping characteristics with respect to forces introduced from different radial directions. Depending on the generally desired damping characteristic, this can be achieved by a corresponding shaping of the inner part or of the elastic pressure body.

According to another embodiment of the bearing according to the present invention, the damping areas have different axial lengths due to a corresponding dimensioning of the elastomer as well as of the intermediate or separating sleeve or sleeves. In a bearing with two damping stages, the outer damping stage preferably has a shorter axial extension than the inner one.

The bearing according to the present invention makes possible an effective gradation of the damping characteristics despite its comparatively simple design and the resulting simple mounting. In the case of a characteristic that is softer toward the middle, shock and vibration loads of high frequency and low amplitude are first damped effectively by the inner damping area of the bearing. If the forces that occur become stronger, i.e., if their amplitude increases, the inner area will come to a stop. Without the presence of a second damping stage, the damping would now be brought about exclusively by the elastomer. On the one hand, there would not be such an effective damping any more as a result, and, on the other hand, the pressure body would be stressed enormously. However, the outer damping area adjusted with the harder range of the characteristic is activated when the inner damping comes to the stop due to the embodiment according to the present invention. Due to the complete uncoupling of the two damping areas, these can have very great differences in terms of their stiffness and each can be adjusted to preset frequencies separately.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
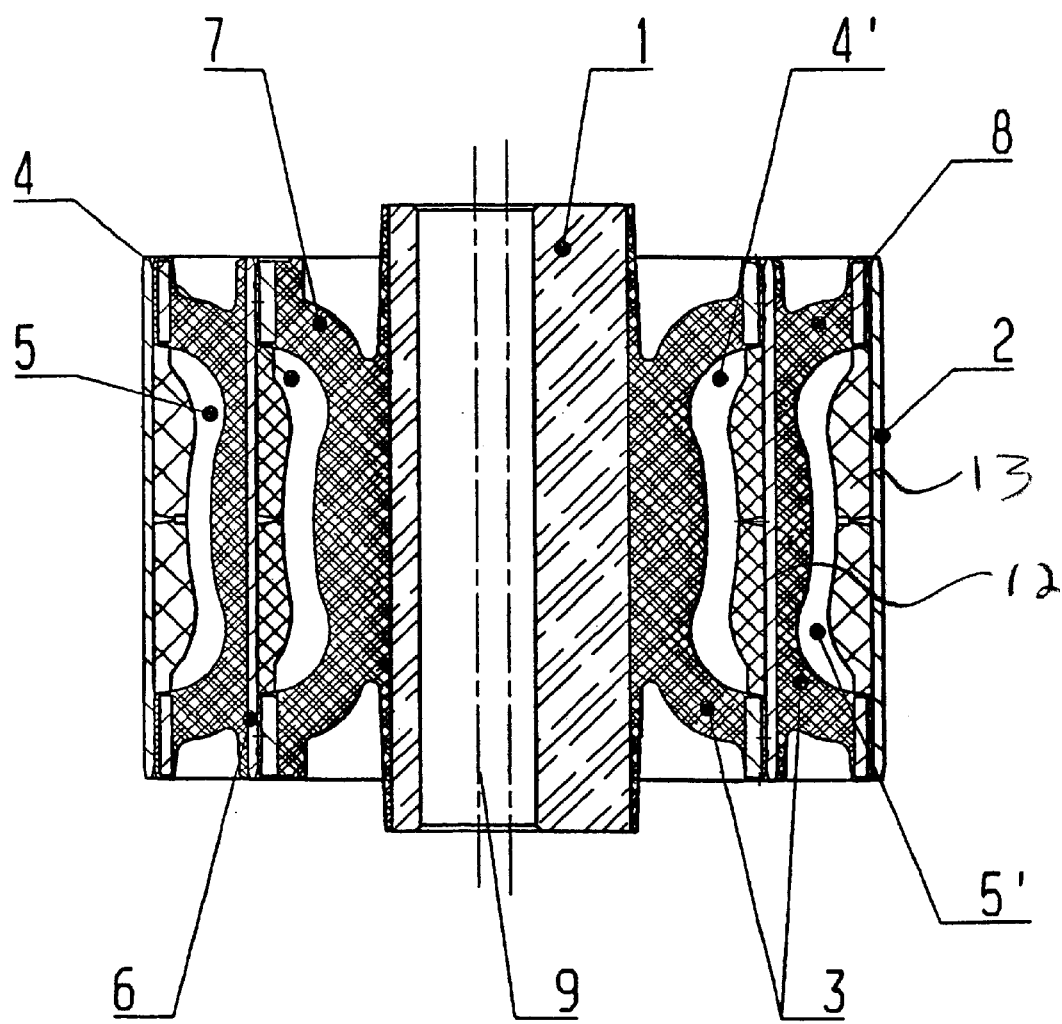
FIG. 1 is an axial sectional view showing the bearing according to the present invention.

Referring to the drawings in particular, FIG. 1 shows the bearing according to the present invention in an axial sectional view. Corresponding to the basic design of rubber bearings, the bearing has an inner part 1, which is usually made of metal. Depending on the intended use, this inner part may extend concentrically or, as is shown in the example being described, eccentrically around the bearing mounting hole 9. The inner part 1 is coaxially surrounded by a tubular outer sleeve 2, which is likewise made, in general, of metal. A pressure body 3 with the chambers 4, 4', 5, 5' for receiving a damping agent is arranged in a fixed manner between the inner part 1 and the outer sleeve 2. To achieve the graduated damping characteristic, the elastomer pressure body 3 is divided, however, unlike in the state of the art, into two closed, mutually independent damping areas 7, 8 by an intermediate sleeve 6 arranged in it.

Figure 2A:
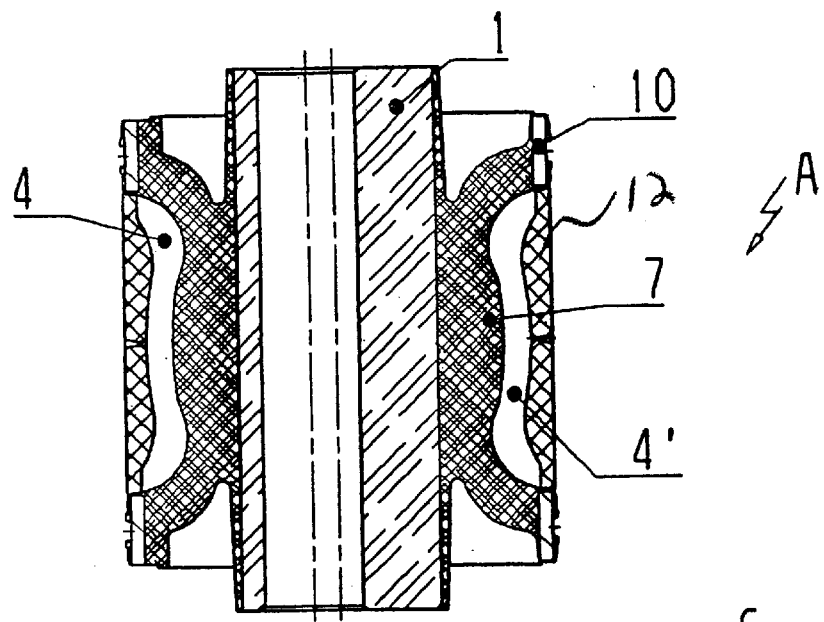
FIG. 2a is an axially sectional view showing a component of the bearing according to FIG. 1 before mounting in of the bearing.
Figure 2B:
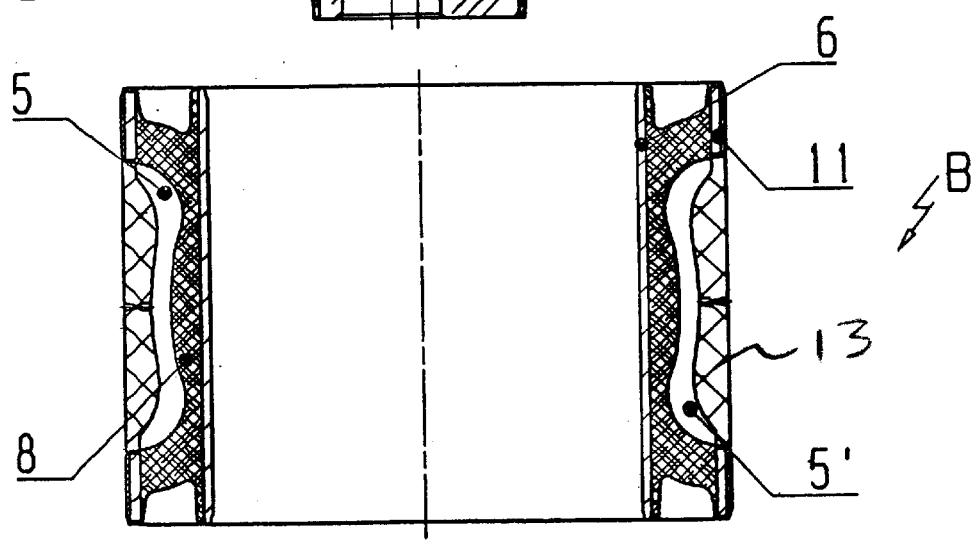
FIG. 2b is an axially sectional view showing another component of the bearing according to FIG. 1 before mounting in of the bearing.
Figure 2C:
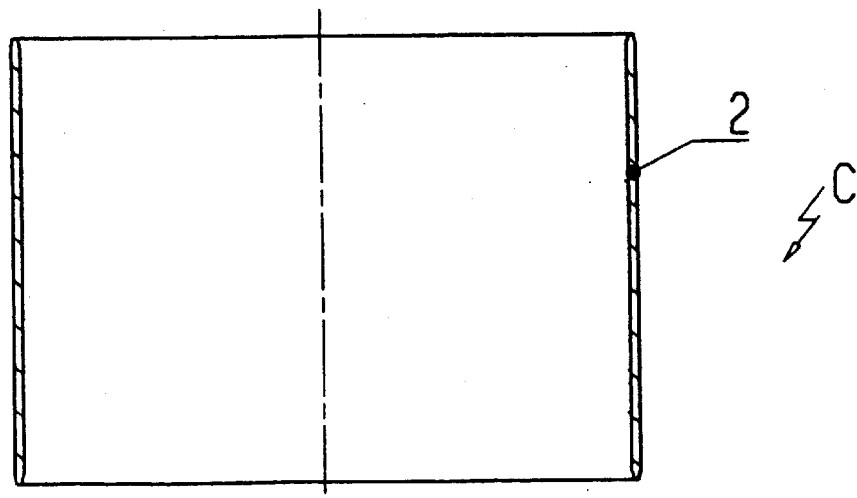
FIG. 2c an axially sectional view showing still another component of the bearing according to FIG. 1 before mounting in of the bearing wherein FIGS. 2a, 2b and 2c, together present an axially exploded view.
Figure 3:
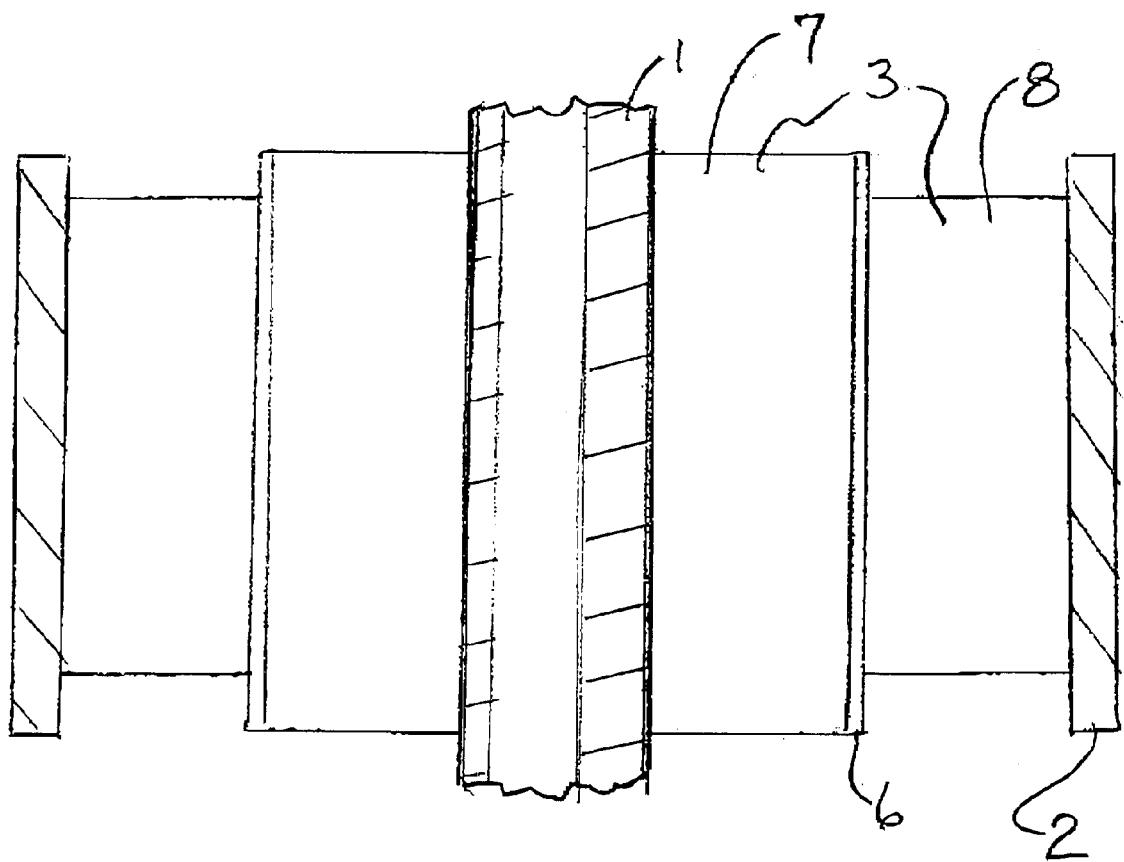
FIG. 3 is a schematic sectional view showing an embodiment of the present invention where the damping areas or pressure bodies have different axial lengths.

This design is illustrated once again in FIGS. 2a–2c by a representation of the bearing in which it is exploded in the axial direction. The individual components A, B, C and the sequence of the manufacturing steps arising during the manufacture of the bearing can be clearly recognized here. The inner part 1 and the elastomer forming the later inner damping area 7 are first connected by vulcanization, forming the chambers 4, 4' intended to receive a damping agent, and this inner component A is also surrounded by a cage 10 in the course of the vulcanization, especially in light of the subsequent mounting. Depending on the design, a plastic clip 12 may then be pushed later over the component A, usually axially centrally, this clip being used to form specially shaped stop faces and/or as a channel carrier for a channel which connects the chambers 4, 4' and is not shown here.

Component B is obtained by connecting the intermediate sleeve 6, which is used to separate the later damping areas 7, 8, to the elastomer forming the damping area 8, likewise while forming corresponding chambers 5, 5'. Component B is also surrounded by a cage 11. Depending on the design, a plastic clip 13 may then be pushed later over the component B, usually axially centrally, this clip being used to form specially shaped stop faces and/or as a channel carrier for a channel which connects the chambers 5, 5' and is not shown here.

Component C is formed exclusively by the outer sleeve 2 surrounding the entire bearing. The simple mounting of the bearing is performed by pressing the components A, B, C into one another, the components A and B being filled with the damping agent before. The different adjustment of the damping areas 7, 8 can be achieved in an advantageous manner by the use of damping agents of different viscosities to fill the chambers 4, 4' and 5, 5'. Movement of the liquid is possible only between the chambers 4, 4' and 5, 5' within one respective damping area 7 and 8.

If a radial force acts on the completely mounted bearing, it is damped up to a certain maximum amplitude only by the damping area 7 in case of a softer adjustment of the inner damping area 7. The pressure body 3 in the inner damping area 7 strikes the inner part 1 only in the case of strong shocks, which occur, e.g., during bracing in the case of the use of the bearing in the suspension arm of a vehicle. The damping effect of the outer damping area adjusted to a harder characteristic comes into action at this moment.

While specific embodiments of the invention have been shown and described in detail to illustrate the application of the principles of the invention, it will be understood that the invention may be embodied otherwise without departing from such principles.

What is claimed is:

1. A rubber bearing with graduated damping characteristic, the bearing comprising:
   a cylindrical inner part;
   a tubular outer sleeve arranged coaxially around said inner part;
   a pressure body with chambers for receiving a damping agent, said pressure body being formed of an elastomer and being arranged in a fixed manner between said inner part and said outer sleeve;
   at least one metallic intermediate sleeve arranged coaxially to said inner part and said outer sleeve, said pressure body being divided by an metallic intermediate sleeve in a radial direction into a plurality of damping areas which are closed in themselves, one of said damping areas having a different axial length extent than another of said damping areas to independently form different damping characteristics.

2. A rubber bearing in accordance with claim 1, wherein said pressure body is divided into two of said damping areas with different damping characteristics with respect to the radial direction.

3. A rubber bearing in accordance with claim 1, wherein said chambers of said two damping areas comprise two different chambers filled with damping agents of different viscosities.

4. A bearing in accordance with claim 1, wherein:
   said inner part defines a bearing mounting hole arranged eccentrically in said inner part.

5. A rubber bearing in accordance with claim 2, wherein said chambers for a damping agent are provided within both said damping areas of said pressure body, wherein said chambers of one of said damping areas and said chambers of another of said damping areas are connected to one another by a channel in a liquid-carrying manner.

6. A rubber bearing in accordance with claim 5, wherein said inner damping area has a softer characteristic than said outer damping area.

7. A rubber bearing in accordance with claim 5, wherein one said damping area or both said damping areas have different characteristics with respect to forces acting from different radial directions.

8. A rubber bearing in accordance with claim 5, wherein an outer damping area adjoining said outer sleeve has a shortest axial length.

9. A bearing in accordance with claim 5, further comprising:
- an inner plastic clip arranged around said chambers of said damping area;
- an outer plastic clip arranged around said chambers of said another damping area.

10. A bearing in accordance with claim 9, wherein:
- said inner plastic clip defines a channel connecting said chambers of said damping area;
- said outer plastic clip defines a channel connecting said chambers of said another damping area.

11. A bearing comprising:
- an inner part having a radially outer surface and extending axially;
- a tubular outer sleeve arranged around said inner part;
- a metallic intermediate sleeve arranged coaxially to said inner part and said outer sleeve;
- a first pressure body with an inner chamber for receiving a first damping agent, said first pressure body being formed of an elastomer and being arranged in a fixed manner between said inner part and said outer sleeve;
- a second pressure body with an outer chamber for receiving a second damping agent said second pressure body being formed of an elastomer and being arranged in a fixed manner between said inner part and said outer sleeve, said first pressure body and said second pressure body being divided in a radial direction by said metallic intermediate sleeve into separate damping areas which are closed in themselves, said first damping agent having a different viscosity front said second damping agent, said first and second pressure bodies being formed to have different and independent damping characteristics; and
- an inner plastic clip arranged around said inner chamber and defining a part of said inner chamber.

12. A rubber bearing in accordance with claim 11, wherein said damping areas have different axial lengths, wherein an outer damping area adjoining said outer sleeve has a shortest axial length.

13. A rubber bearing in accordance with claim 11, wherein said first pressure body provides an inner damping area with a softer characteristic than said second pressure body which provides an outer damping area.

14. A bearing in accordance with claim 11, wherein:
- said different viscosities form said different and independent damping characteristics;
- said first pressure body and said second pressure body have different axial lengths to further form said different and independent damping characteristics.

15. A bearing in accordance with claim 11, wherein:
- said inner plastic clip divides said inner chamber into first and second inner chambers, said inner plastic clip defines a channel connecting said first and second inner chambers.

16. A bearing in accordance with claim 11, wherein:
- said inner plastic clip has shaped stop surfaces to further form said different and independent damping characteristics.

17. A bearing in accordance with claim 11, further comprising:
- an outer plastic clip arranged around said outer chamber and defining a part of said outer chamber.

18. A bearing in accordance with claim 17, wherein:
- said inner plastic clip divides said inner chamber into first and second inner chambers, said inner plastic clip defines a channel connecting said first and second inner chambers;
- said outer plastic clip divides said outer chamber into first and second outer chambers, said outer plastic clip defines a channel connecting said first and second outer chambers.

* * * * *